Patented Oct. 12, 1926.

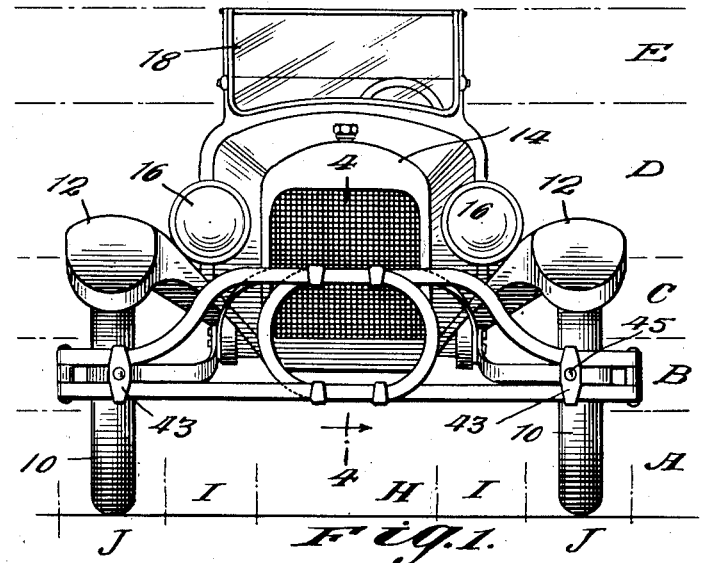
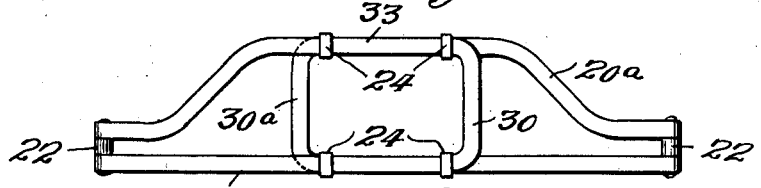
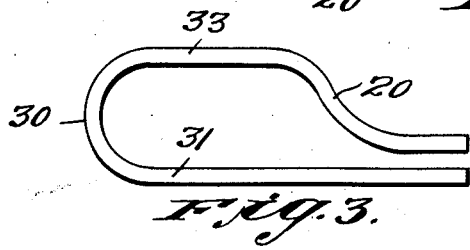
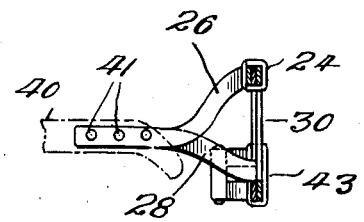
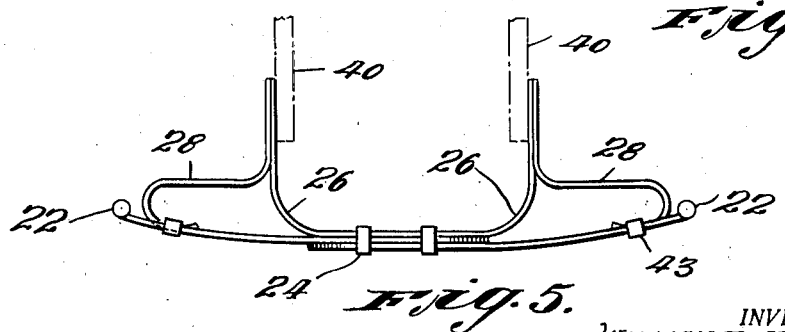

1,602,609

UNITED STATES PATENT OFFICE.

WILLIAM P. HAMMOND, OF SCARSDALE, AND HENRY C. HEBIG, OF BROOKLYN, NEW YORK; SAID HEBIG ASSIGNOR TO THE SAID HAMMOND.

BUMPER FOR AUTOMOBILES.

Application filed January 2, 1925. Serial No. 20.

This invention relates to automobile accessories, more especially to protective devices generally termed bumpers.

That the true significance of our invention may be understood, it is necessary that the zones, or portions, of a motor vehicle which require protection be defined.

This is perhaps most easily accomplished by reference to Fig. 1 of the drawings, wherein a front elevation of the typical motor vehicle is shown.

Zone A, that between the ground and the bottom of the older forms of bumper, requires no protection, since that portion of the wheels below their centre is capable of surmounting minor obstacles, and since that portion between the wheels is of ample height to avoid such minor obstructions.

Zone B defines the horizontal zone protected by previously known bumper constructions. This zone is usually from three to six or eight inches wide and a bumper in this zone provides some degree of protection from obstacles which project vertically upward from the ground.

Zone C is above the ordinary bumper zone, and, while it is protected from objects projecting vertically upward as previously mentioned, it is totally unprotected from obstacles which may project horizontally toward the machine or which may project upward at an inclination to the vertical. This zone includes such easily damaged and fragile parts of the automobile as fenders, radiator structures and the lamps. Thus, an object which would pass over the bumper zone B will crumple up the automobile fender or radiator regardless of support or efficiency of the bumper arranged in B zone. This often occurs when another vehicle having an overhanging part, or a bumper mounted somewhat higher, is struck.

Zones D and E are substantially above the greatest number of obstacles and are not particularly liable to destruction thereby. However, at times the inclination of such obstacle is such that before it contacts with the ordinary bumper in zone B, it will have contacted with and destroyed the automobile radiator or in some instances the automobile windshield and top.

A particularly pertinent example of such obstacles is found in the bumpers of other automobiles which have a higher "slung" body or a bumper mounted at a greater distance above the road than usual. Such high bumpers or body parts will pass over a bumper in zone B and destroy the unprotected automobile parts.

The area to be protected may also be divided into vertical zones, the central zone H including the radiator and the major portion of the windshield adjacent and the parallel zones I—I, lying on either side of zone H, including the automobile lamps and a portion of the mudguards or fenders.

Zones J reach from the ground upward beyond the confines of zones I—I and include the fenders proper and objects lying in similar horizontal relation to the automobile body.

As above indicated, formerly known bumper devices have protected only that part of the vehicle within zone B. It is our purpose to provide a bumper construction which will adequately protect horizontal zones B, C, D and E and all of the vertical zones mentioned.

It is also our purpose to provide a bumper construction which will be so proportioned as to cushion and distribute any shocks to the automobile frame and which will be so reinforced at those points requiring maximum strength as to withstand a blow from obstacles in any of the zones mentioned.

It is an especial purpose of our invention to provide a pumper structure which will be simple, low in cost, easily applied and of such design as to conform with, and add to, the pleasing contour of the automobile body parts.

A particular purpose of our invention is to provide a bumper structure which will be constructed of few parts and which, by a suitable engagement and interlinking of said parts, will reinforce the points liable to maximum strain and will effectively cover all of the zones previously indicated while providing a device of adjustable width and universal adaptability.

Referring now to the drawings as a whole,—

Fig. 1 is a front elevation of the automobile provided with one embodiment of our improved bumper structure.

Fig. 2 is a front elevation of the bumper structure as removed from the automobile, certain modifications being shown, Fig. 3 is an elevation of one element, or loop, employed in the construction of our improved bumper.

Fig. 4 is a side elevation of the device shown in Fig. 1, taken cross sectionally on the line 4—4 of that figure.

Fig. 5 is a plan view of the bumper structure.

Referring to Fig. 1, the wheels of a motor vehicle are indicated at 10, the fenders or mudguards at the numeral 12, the radiator at 14, and the lamps at 16—16. The motor vehicle is also commonly equipped with a glass windshield 18 after the manner shown. The general relationship of these parts to the various horizontal and vertical zones has already been mentioned. The method by which the improved bumper is constructed, and the arrangement of the parts thereof, together with the relationship with the various automobile parts, will now be described.

Reference is made particularly to Fig. 3, in which a loop member 20 is shown. Figs. 2 and 4 show loop 20 combined with a secondary loop member 20ª and joined thereto by the end members 22, with clamping members 24, and with supporting members 26 and 28 added to form a complete bumper.

It will be noted that the closed ends 30 of loop member 20 rise vertically from the horizontal portions 31 and 33 of the aforesaid loops. Thus, when loops 20 and 20ª are laid one over the other as shown in Figs. 2 and 4, members 30 are mounted substantially parallel with the side or radiator 14, and, as shown in Fig. 1, form a pleasing continuation of the radiator design.

Manifestly, the form of this vertical portion may be curved, or otherwise distorted, so as to conform with the radiator design. It is also noteworthy that as the two loops lie one over the other at the center portion of the bumper, zone H is protected by the double thickness of bumper members 33 and 31 of the two loops. An object struck head-on by the motor vehicle would, therefore, be met by this central portion of the bumper which is doubly reinforced, as mentioned. The upwardly projecting portions of loops 20 serve to protect the motor vehicle parts lying within the vertical zones H and I—I, while at the same time supporting the horizontal bars 33 substantially higher than the usual bumper zone B.

That this uppermost portion of the bumper which protect zones C, D and E, may be further reinforced, we prefer to extend the upper mounting member 26 upward and forward, from its connection with the automobile frame at 40 to contact with members 33; member 26 is extended parallel to members 33 through clamps 24, then downward and rearward to connect with the other side of the automobile frame. In this manner the upper member of the bumper is triply reinforced where most likely to receive a blow.

The lowermost mounting members 28 also attach to the frame 40 by such means as the rivets 41 which may also engage the mounting members 26. The lowermost members 28 preferably extend forwardly and outwardly to connect with suitable clamps 43 which are fastened adjacent the ends of both loops 20 by means of suitable clamping bolts 45.

The ends of loops 20 project outwardly as shown in Fig. 1 so that they adequately protect outermost zones J—J and objects therein. We prefer to bend the ends of the loops rearwardly about members 22, which serve to form a substantial terminus of pleasing appearance.

The use of loop units 20 and clamps 24 provides a structure which may be adjusted to any width of automobile and which may be widened or narrowed to extend the protected zones horizontally, as desired. It will be noted that this adjustment is accomplished without interchange of parts and without changing the structure of any part; thus a single article of manufacture will serve to provide that bumper structure particularly suited to a given vehicle. This permits substantial economies in manufacture, storage, sale and cost of application.

As those skilled in the art will understand, the parts of such bumpers are commonly constructed from strips of spring steel substantially wider than thick, but it will be understood that the construction herein described may also employ members of circular or tubular cross section with improvement over structures of the prior art.

It will be seen that the device described accomplishes all of the objects hereinbefore mentioned, and that it does so by use of a simple construction of such pleasing contour as to add to, rather than detract from, the appearance of the motor vehicle to which it is attached. It will also be manifest that while adequate and improved protection is provided within the usual bumper zone B, zone C is just as adequately protected and zones D and E are afforded an added amount of protection.

It will be clear that many modifications may be made in the parts of our invention and in the arrangement thereof without departing from the spirit of the invention defined by the appended claims.

We claim:

1. In an automobile bumper, a plurality of open-ended loop members, means for adjustably clamping said loop members together, and means for mounting the loops with the loop plane substantially vertical and with the open loop ends outward.

2. In an automobile bumper, a plurality of loop members, and mounting members supporting said loop members parallel to the automobile body with the open ends of said loops projecting outward beyond said body and with the closed ends of each of said loops projecting inward to a point beyond the center line of said automobile and engaging with the other of the aforesaid loops to reinforce the same.

3. In an automobile bumper, a horizontal lower member in combination with an upper member having a portion substantially parallel with and adjacent to said lower member, an upwardly and inwardly extending portion, a horizontally extending portion, a downwardly and outwardly extending portion and a substantially horizontal terminus portion in similar adjacence to said lower member as the first said member to the first said upper portion aforesaid.

4. An automobile bumper, comprising a plurality of loop members supported parallel with and spaced from the automobile, supporting members engaging said loops adjacent their ends, and a secondary supporting member engaging the uppermost turn of said loops to reinforce the same.

5. An automobile bumper, comprising loop members supported in a vertical plane spaced from the automobile, means closing the open ends of said loops, mounting members engaging said loops adjacent said means and a third mounting member engaging the uppermost turn of said loops and lying in parallel contiguity thereto at substantially the center of the bumper to reinforce the same.

6. A bumper for automotive vehicles, comprising overlapping loop members with portions of each member parallel with and contiguous to portions of the other member, means for mounting said loops in a vertical plane adjacent the automobile, and adjustable means retaining said parts together and permitting adjusted assembly to suit a given vehicle.

7. An automobile bumper having a substantially horizontal lower member, and an upper member having its ends in parallel adjacent to said lower member, the intermediate portion of said upper member being also parallel to said lower member but substantially removed therefrom.

8. In an automobile bumper, a lower member, an upper member, supporting means engaging both of said members adjacent their ends and the automobile frame, and secondary supporting means engaging said upper member at substantially the center thereof and the automobile.

9. In an automobile bumper, a multiple zone protector comprising a pair of members each having a lower zone protecting portion member, an upper zone guard and means for supporting said members in adjustable, spaced relationship to each other and to the automobile.

10. In a mounting element for an automobile bumper, a member providing within itself an automobile frame-engaging portion, an inwardly and upwardly extending portion, a horizontal portion and a downwardly and outwardly extending portion, the last said portion terminating in a frame-engaging portion substantially parallel to the first said frame-engaging portion and spaced therefrom to engage the opposite side of the automobile frame.

11. As an element of the automobile bumper, a loop member comprising a substantially horizontal end portion, a closed end portion rising from said horizontal portion, an upper portion substantially parallel with said lower portion and extending from said closed end portion to an outwardly and downwardly extending portion terminating in an end portion substantially parallel with and adjacent to the end of the first said end portion.

In testimony whereof we have affixed our signatures to this specification.

WILLIAM P. HAMMOND.
HENRY. C. HEBIG.